United States Patent [19]

Tietema

[11] Patent Number: 4,999,760
[45] Date of Patent: Mar. 12, 1991

[54] HIGH VOLTAGE RECTIFIER AND ASSOCIATED CONTROL ELECTRONICS

[75] Inventor: Roel Tietema, Venlo, Netherlands

[73] Assignee: Hauzer Holding B.V., Venlo, Netherlands

[21] Appl. No.: 449,648

[22] Filed: Dec. 12, 1989

[30] Foreign Application Priority Data

Feb. 20, 1989 [EP] European Pat. Off. ............ 89102893

[51] Int. Cl.[5] ........................................... H02H 7/125
[52] U.S. Cl. ........................................ 363/53; 363/65; 363/89; 323/271; 219/69.18; 219/121.34
[58] Field of Search ................. 363/50, 52, 53, 65, 363/86, 89, 3; 323/268, 271, 910; 219/69.13, 69.18, 69.19, 121.34

[56] References Cited

U.S. PATENT DOCUMENTS

| | | | |
|---|---|---|---|
| 3,354,378 | 11/1967 | Jewett | 363/53 |
| 3,371,262 | 2/1968 | Bird et al. | 363/53 |
| 3,818,307 | 6/1974 | Hamilton et al. | 363/65 |
| 4,103,324 | 7/1978 | Vandervelden et al. | 323/910 |
| 4,384,321 | 5/1983 | Rippel | 363/89 |
| 4,447,695 | 5/1984 | Inoue | 219/69.18 |
| 4,654,776 | 3/1987 | Basire | 363/89 |
| 4,712,171 | 12/1987 | Yamashita | 363/89 |
| 4,719,553 | 1/1988 | Hinckley | 363/89 |

Primary Examiner—Peter S. Wong
Attorney, Agent, or Firm—Townsend and Townsend

[57] ABSTRACT

A high voltage rectifier with provisions for rapidly limiting or discontinuing the current flow in response to the occurrence of overcurrents and rapidly restoring such current when the overcurrents cease. The rectifier comprises one or more stages, each stage comprising a rectifier fed from a secondary transformer winding, a subsequent smoothing capacitor, a first switch serving as a direct D.C. converter for regulation of the output voltage, a choke and capacitor for smoothing the current and a second switch, activated by overcurrents, such that the smoothing chokes can be switched over by the second switch into a first recovery circuit wherein, prior to each switching off of the respective second switch the associated first switch is switched on for a predetermined period of time and then switched off.

12 Claims, 3 Drawing Sheets

HIGH VOLTAGE RECTIFIER AND ASSOCIATED CONTROL ELECTRONICS

BACKGROUND OF THE INVENTION

The invention relates to a high voltage rectifier, in particular for use as a bias voltage supply in vacuum processes such as PVD coating processes, comprising an input transformer and also subsequent rectification, smoothing and switching units and also an arrangement for switch control in dependence on occurring overcurrents. Furthermore, the invention is directed to an electronic control circuit which is particularly intended for use in connection with such a high voltage rectifier.

So far as PVD processes are concerned one can essentially distinguish between three process phases, namely the heating phase, the cleaning phase and the coating phase. During the heating phase heating and cleaning of the product is carried out by a ionised gas. The metal vaporizers are not switched on. The high voltage rectifier delivers the energy to the plasma. During the cleaning phase the metal vaporizers are switched on. Metal ions are generated by means of arcing and form a plasma of heavy ions. The substrate is kept during this at the highest maximum voltage value by the high voltage rectifier. In the coating phase the ions from the metal vaporizer are for example mixed with a gas and deposited onto the substrate. During this phase the high voltage rectifier which can generate a voltage of 1000 Vgs and higher delivers a lower voltage amounting to for example less than 400V.

With such coating processes the occurrence of arc discharges on the substrate, which represent short circuit-like loads for the high voltage rectifier are unavoidable and attempts must therefore be made to detect such arc discharges without delay in order to avoid the damaging effects which result from this and to remove the applied voltage from the substrate.

The object underlying the invention is thus to develop a high voltage rectifier of the initially named kind in such a way that arc discharges can be detected within a very short time, so that switching off can be made without delay following detection of an arc discharge and thus so that damaging effects on the substrate can be prevented.

SUMMARY OF THE INVENTION

This object is solved in accordance with the present invention essentially in that in each case, a rectifier fed from a secondary transformer winding is combined with a subsequent smoothing capacitor, with a first switch serving as a direct DC converter for regulation of the output voltage, with a choke serving for smoothing of the current ripple and also a capacitor intended for smoothing of the output voltage, and with a second switch controlled in dependence on occurring overcurrents, into a rectifier stage across the output of which there is connected a recovery diode; and in that the smoothing chokes can be switched over by the respective second switch to a first recovery circuit, wherein, prior to each switching off of the respective second switch the associated first switch is brought into the conductive state for a predetermined short period of time and is then switched off.

Through the layout of the high voltage rectifier in accordance with the invention it is possible to achieve an ideal matching to the respective process phase. The cooperation of the first and second switches, in conjunction with the first and second recovery circuits, makes it possible to ensure that even with the occurrence of high current sink rates, and thus the occurrence of high peak voltages at the inductors, no operating states can occur which lead to destruction of or damage to switching elements, in particular the semiconductor elements. Nevertheless it is possible to straightforwardly detect and switch off an arc discharge within fractions of a millisecond. The switching arrangement furthermore makes it possible for the maximum output voltage of the rectifier to be reached again very rapidly after the arc discharge has been switched off.

A construction of the high voltage rectifier from several similar stages in the form of a series circuit of these stages is of advantage because no particularly high requirements need be placed on the individual components with regard to their electric strength, and thus the use of favourably priced components is possible.

A possible electronic control circuit for a high voltage rectifier which is preferably formed in the already described manner is characterised, in accordance with the invention, by a detection and regulation circuit which, in dependence on the occurrence of an arc or a predeterminable maximum current brings about a change-over from the voltage regulation used in normal operation to a regulation with current restriction, with the desired value of the current being at least substantially equal to the last transmitted actual value of the current prior to the occurrence of the arc, and with a switching back to the voltage regulation taking place with renewed adjustment of the output voltage to the maximum value as soon as the arc is quenched.

This electronic control circuit makes it possible to intentionally burn away with reduced power contaminations which are the cause for arc discharges on the substrate and thus to ensure that the total time of occurrence of the arc discharges is shortened.

The invention will now be described in detail in the following with reference to embodiments and to the drawings in which are shown:

BRIEF DESCRIPTION OF THE PREFERRED EMBODIMENT

Figure 1:
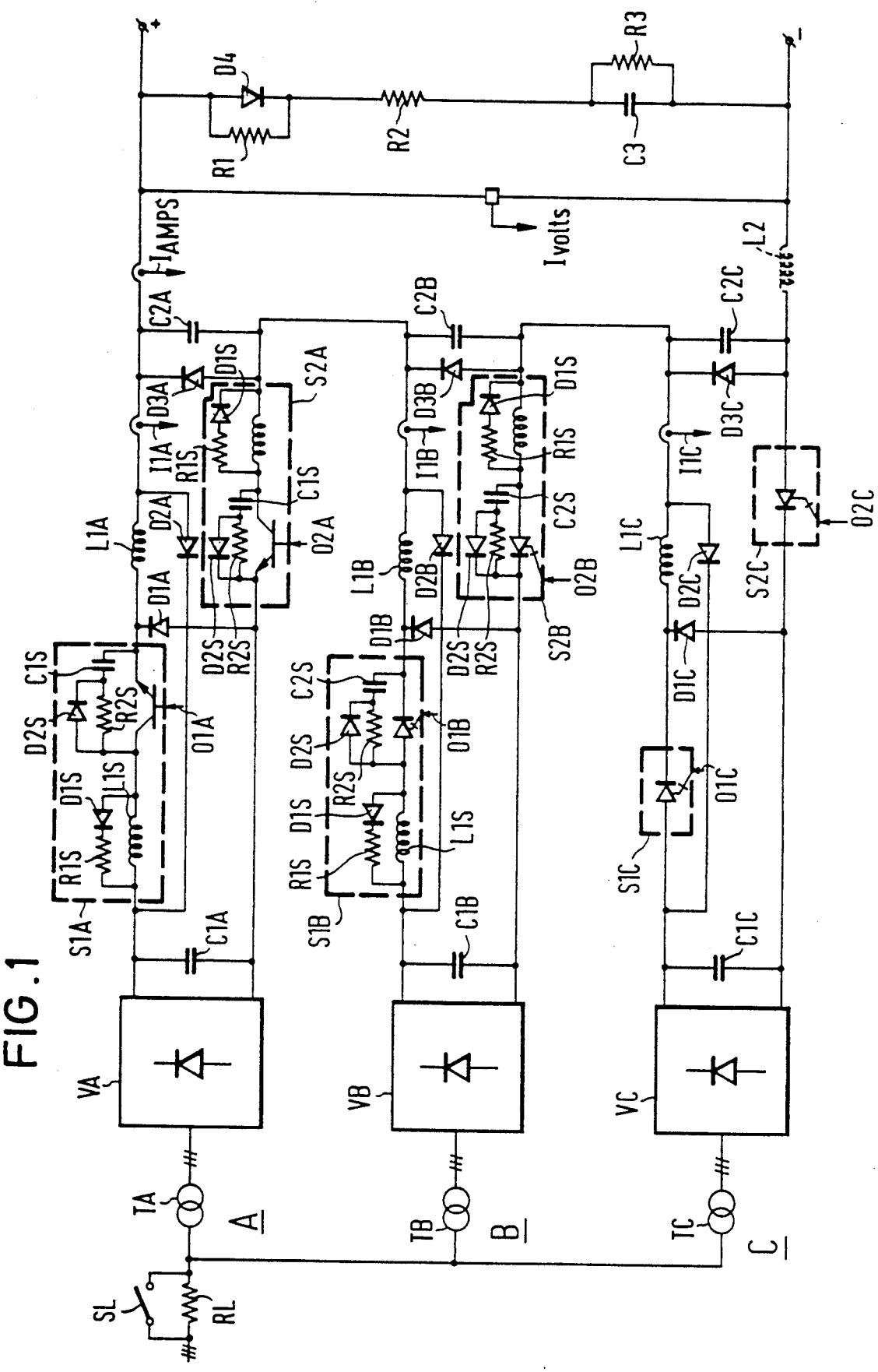
FIG. 1 a schematic block circuit diagram of a high voltage rectifier in accordance with the invention, FIG. 2 a block circuit diagram of a switching arrangement for generating the control pulses for the circuit arrangement of FIG. 1, and FIG. 3 a block circuit diagram of an electronic control circuit which can be used in conjunction with a four-stage high voltage rectifier of FIG. 1.

The high voltage rectifier of FIG. 1 consists of several stages connected in series which are characterised by the letters A, B, C. Each stage is in principle of similar construction, although individual switching elements can be different.

Each stage A, B, C is fed via a secondary transformer winding in order to ensure a galvanic separation between the mains voltage and the output voltage. All secondary windings can be provided on a respective transformer or can be arranged on a common transformer. In FIG. 1 three individual transformers TA, TB and TC are shown by way of example.

The secondary voltage coming from the respective transformer is rectified by a rectifier VA, VB or VC and smoothed in each case by a subsequent smoothing capacitor C1A, C1B, C1C.

In each stage there then follows a switch S1A, S1B or S1C respectively on a semiconductor basis which is used in switching operation as a DC converter in order to regulate the output voltage of each stage between the value zero and a maximum value. A transistor switch is used in stage A whereas GTO switches are provided in stages B and C. It is however only important that semiconductor based switches are used and that these switches are able to be switched off by one control pulse or several control pulses.

Each respective switch is followed by a choke L1A, L1B or L1C respectively for smoothing the current ripple. A smoothing capacitor C2A, C2B or C2C respectively is provided in each stage to smooth the output voltage.

It is of particular advantage that a relatively small choke can be used as a result of the high switching frequency which is used in practical operation and this is favourable with regard to the desired compactness of the rectifier.

Furthermore, a switch S2A, S2B and S2C respectively is provided in each stage in order to interrupt the current of the respective stage or to reduce it to zero on the occurrence of arc discharges, or in the occurrence of short circuits or large overloads at the output terminals of the overall rectifier.

The current in the chokes L1A, L1B, L1C respectively is switched over by the switches S2A, S2B, S2C respectively to the recovery circuit S1-L1-B2. In this way the output current is reduced to zero.

It is important that the switch S1A, S1B, S1C respectively is made conductive for a specific time of for example approximately 100 microseconds at the instant before switching off of S2A, S2B and S2C respectively in order to ensure that the respective capacitor C1S, C2S, C3S is discharged when the respectively associated switch S1A, S1B, S1C is switched off. This measure ensures that the associated switch cannot be damaged or destroyed.

A recovery diode D3A, D3B and D3C provided at the output of each stage A, B, C respectively ensures that each stage can operate independently, i.e. independently of whether one or more further stages of the rectifier are switched off. A RCD network is provided between the output terminals of the rectifier, serves as an overvoltage relief circuit and consists of a parallel circuit of a resistor R1 with a diode D4, a resistor R2 connected in series thereto and a resistor R3 lying in the same series circuit with the capacitor C3 connected parallel thereto.

The output voltage of the rectifier is designated with $I_{Volts}$ and the output current is characterised with $I_{Amps}$. The required control signals for the switch are formed via these parameters.

Figure 2:
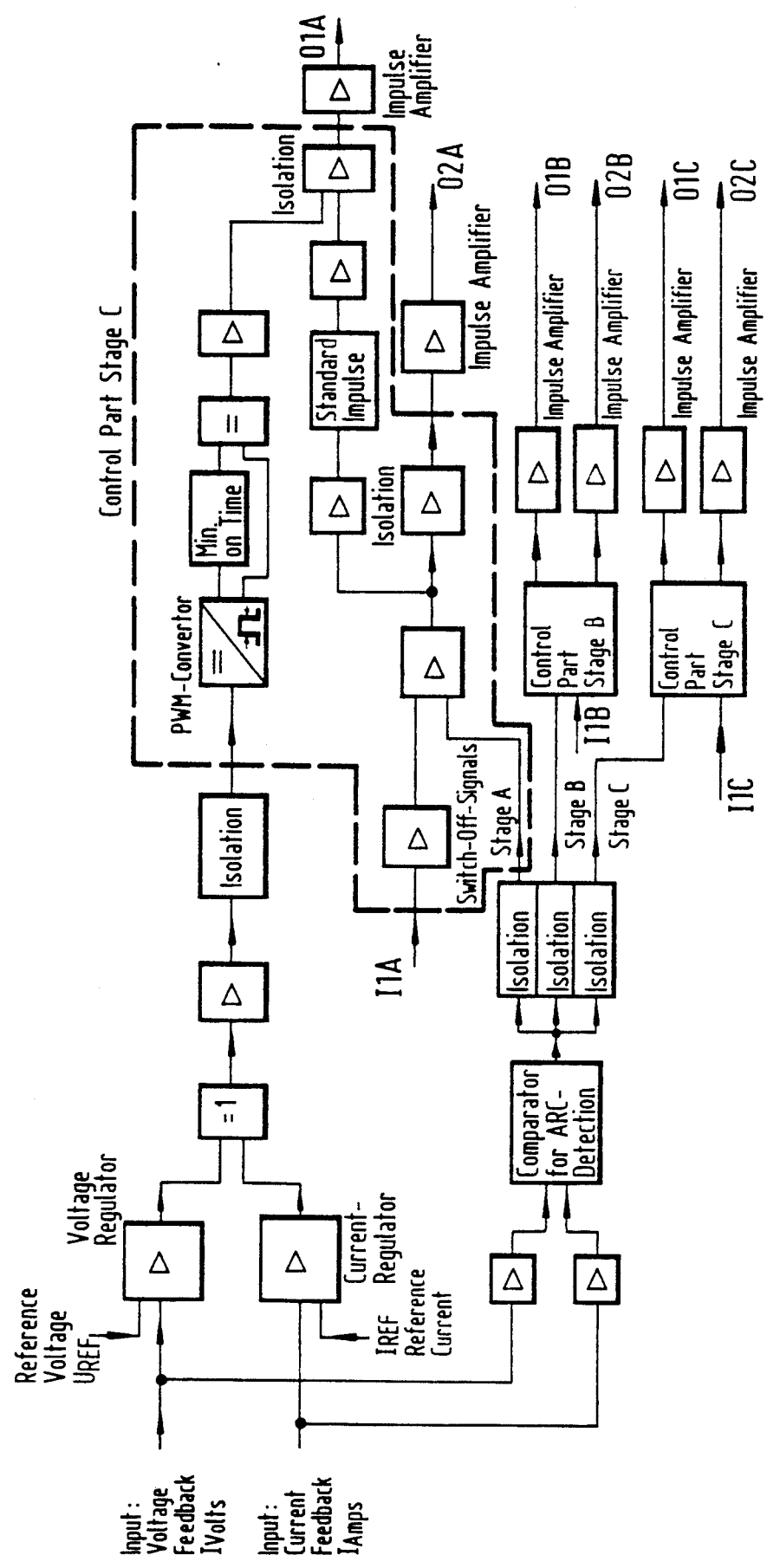

FIG. 2 shows a schematic block diagram of an example of a circuit arrangement for obtaining control signals, with the mentioned feedback signals $I_{Volts}$ and $I_{Amps}$ forming the input signals.

The signals O1A, O1B, O1C and O2A, O2B, O2C respectively which are obtained at the output of this circuit arrangement then represent the control signals for the switching in and switching out of the switches S1A, S1B, S1C and S2A, S2B, S2C of FIG. 1 respectively.

It should also be mentioned that the resistor RL provided at the input side in the circuit arrangement of FIG. 1 represents a charging current restricting resistor for the smoothing capacitors C1A, C1B, C1C. After charging of the capacitors this resistor RL is bridged by means of the switch SL.

The manner of operation of the circuit arrangement of FIG. 1 will now be explained in the following. The three stages of the circuit arrangement of FIG. 1 provided in the embodiment can be so laid out that the stage A delivers a DC current at a voltage of a maximum of approximately 200 Volts and the stages B and C deliver a DC current at a voltage at a maximum of approximately 500 Volts in each case. Thus, in accordance with this example, a DC voltage of 1200 Volts is available at the output. In just the same way it would be possible to operate with two steps of 250 Volts each, so that a voltage of 500 Volts is available for the coating process. The cited values simply represent examples.

In the cleaning phase of the process a maximum output voltage is used, i.e. the GTO stages B and C are fully conductive during this process phase. This simultaneously signifies that the first switches S1B and S1C of stage B and stage C are permanently conductive whereas the first switch S1A of stage A is switched and regulates the output current and the output voltage.

The stages B and C first pass into switching operation outside of the control range of stage A, which has the advantage that under normal process conditions it is only a switching of transistors, i.e. a switching with approximately 10 kH which takes place and thus a substantially lower noise burden occurs than in the case of switching of the GTO stages which operate with a switching frequency of approximately 2 kH.

The regions in which the GTO's are in switching operation are always moved through quickly in the normal operating range.

It is only during the heating phase of the process that it can be necessary to operate for a longer period of time in an intermediate range, however there the initial current is relatively small so that the noise burden caused by the GTO's remains relatively small. During the actual coating process it is only the stage A of the rectifier which is operating.

During the occurrence or detection of an arc discharge all stages are immediately blocked. This avoids the occurrence of very high arc currents on the substrate and thus removes the danger of damage to the respective substrate. At the instance of occurrence of an arc discharge the capacitor C1S can still lie at a higher voltage as this capacitor must first discharge via R2S and the transistor or the corresponding GTO switch respectively. This signifies that this switching element, because of the arc discharge present at the output, must switch off a very large current at a high repeating voltage. In such an operating state the semiconductor could be destroyed or at least damaged.

In order to avoid this danger the procedure is such that on finding an arc the switch S2 first cuts off and at the same time the switch S1 is made conductive or held in the conductive state for a short delay time delta t. If the switching off of S2A takes place then the current of S2A is switched over to a recovery circuit containing the choke L1A, the diode D2A and the switch S1A. After the expiry of the time delta t the switch S1A is also switched off and a further recovery circuit then arises via the choke L1A, the diode D2A, the capacitor C1A and the diode D1A. In addition a recovery circuit is realised via L1S, D1S and R1S.

In this manner one ensures that the energy stored in the choke L1A is fed back into the capacitor C1A.

The processes indicated for the stage A now take place in analogous manner in the other stages.

On renewed switching on of the stage A the switch S2A is first switched on. The switching on of the switch S1A takes place after the switching on of the switch S2A and this preferably takes place not abruptly but rather via a comparatively rapid soft start.

The determination of an arc discharge takes place via the signal $I_{Amps}$ its value exceeds a predetermined current value. In accordance with a special feature of the invention the switching off can however also take place at a low current value when the output voltage determined via the signal $I_{Volts}$ sinks. As a result of this procedure the detection relative to the occurrence of arc discharges is made substantially more sensitive. In so doing it is however ensured that the current switch off level does not fall below a specified minimum value.

Figure 3:
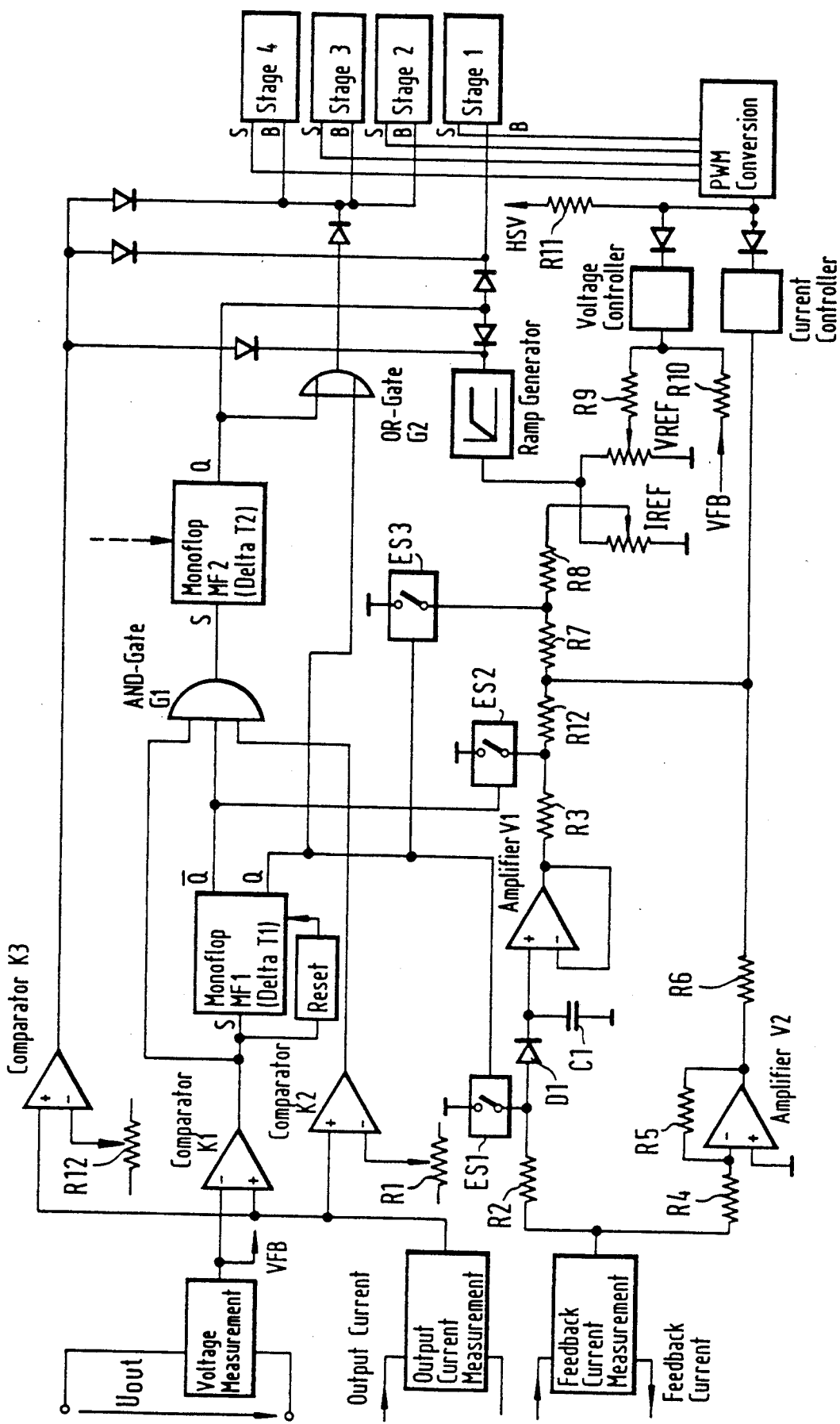

FIG. 3 shows an advantageous embodiment of an electronic control circuit for use in conjunction with a high voltage rectifier in accordance with FIG. 1.

This electronic control circuit makes it possible to selectively burn away contaminations on the substrate during the cleaning phase of the process with restricted power. This is achieved in that one allows the regulation to work during the occurrence of an arc discharge in current restriction and uses as the desired value of the current the value of the current which corresponded to the last conveyed actual value prior to the occurrence of the arc. After the disappearance of the arc the switching arrangement is again switched over to voltage regulation and the output voltage is returned to its maximum value.

The manner of operation of the electronic control circuit shown in FIG. 3 in the form of a block circuit will be subsequently explained.

At the input side the prevailing actual value of the voltage VFB is compared with a voltage value derived from the output current in a comparator K1. This comparator K1 switches at a smaller current value when the voltage has dropped than in the case of the presence of a high output voltage, as has already been explained in principle.

A switching over of the comparator K1 corresponds to the detection of an arc discharge during which the output voltage drops in known manner to a low value.

A monoflop MF1 connected after the comparator K1 gives a pulse logic 1 at the output $\overline{Q}$ when the comparator K1 switches after a high level. If the level of K1 is high then the output Q goes to logic zero and the output $\overline{Q}$ is logic 1 during a time period delta t1.

The actual value of the current is then passed, i.e. under normal circumstances, via an amplifier V2 and a resistor R6 to a current regulator whereas the desired value of the current passes via the resistors R8 and R7 to the current regulator. If no arc discharges occur then an electronic switch ES2 is closed, whereby the amplifier V1 does not influence the current regulator via the resistor R3.

The current regulator operates in parallel with a voltage regulator and the output voltage of these two regulators is respectively converted to pulses which are passed to rectifier stages 1 to 4 which are constructed analogously to the stages A, B and C explained in connection with FIG. 1.

A capacitor C1 is charged via the filter formed by R2, D1 and C1 to a value which corresponds to the last flowing output current prior to the occurrence of an arc discharge. It should be noted that the electronic switch ES1 and also the electronic switch ES3 are always open when no arc discharges occur.

If an arc discharge is detected, or if as an option, the occurrence of several arc discharges during a specific time is defined as the criteria and a process of this kind is detected, then the comparator K1 switches. This has in turn the consequence that the monoflop MF1 switches, whereby in turn the switch ES1 is closed and the switch ES2 is opened.

In this way the current value stored in the capacitor C1 is passed as the desired value for the current to the current regulator. The desired value IREF is removed by the closing of ES3.

In conjunction therewith a blocking of all output stages with the exception of stage 1 is then brought about via an OR gate G2. This stage 1 should namely deliver the restricted current which is passed via C1, R12 as the desired value to the current regulator.

A current monitoring takes place by means of a comparator K2. This comparator K2 switches when the current exceeds a certain value set via the resistor R1, however the switching of this comparator K2 has no effects when the comparator K1 is not switched. In the same manner the switching of the comparator K2 during the time period delta t1 has no effects because the output $\overline{Q}$ of the monoflop MF1 is zero.

When the arc discharge has disappeared during the time delta t1 the apparatus return to a voltage regulation, with a reset signal being transmitted on switching back from the comparator K1 to the monoflop MF1.

If the arc discharge remains in existence during the time duration delta t1, and if a current value occurs which is above the level determined by R1, then the output Q of the monoflop MF1 becomes high because of the expiry of the time delta t1, the comparator K1 however remains high because of the still existent arc discharge, and the comparator K2 is likewise high because the current is larger than the value set via R1.

In this case the AND gate G1 also switches high and the output Q of the monoflop MF2 is high for a time duration delta t2. This has in turn the consequence that all end stages, namely the stages 1 to 4 are blocked, and that the supply voltage of the desired value setting device and also the desired values themselves are set to zero.

After the expiry of the time duration delta t2 it is certain that the output voltage and the output current have reached the value zero, and thus that the arc discharge is quenched.

The desired values are then brought back to the set values via a ramp generator with a steep rise, and the output position of the apparatus in normal operation is reached again.

A comparator K3 serves to specify an absolute current maximum value at which all stages are blocked when this maximum value is exceeded.

The described circuit arrangements can be modified in various respects without departing from the basic concept of the present invention. Thus it is for example possible, in place of the feedback signal $I_{Amps}$ to tap off a feedback signal within an individual stage, for example at the position where, in FIG. 1, the value I1A is tapped off.

I claim:

1. High voltage rectifier, in particular for use as a bias voltage supply in vacuum processes such as PVD coating processes, comprising an input transformer and also subsequent rectification, smoothing and switching units and also an arrangement for switch control in dependence on occurring overcurrents, characterised in that in each case, a rectifier (VA, VB, VC) fed from a secondary transformer winding is combined with a subsequent smoothing capacitor (C1A, C1B, C1C), with a first switch (S1A, S1B, S1C) serving as a DC converter for regulation of the output voltage, with a choke (L1A, L1B, L1C) serving for smoothing of the current ripple and also a capacitor (C2A, C2B, C2C) intended for smoothing of the output voltage, and with a second switch (S2A, S2B, S2C) controlled in dependence on occurring overcurrents into a rectifier stage (A, B, C) across the output of which there is connected a recovery diode (D3A, D3B, D3C); and in that the smoothing chokes (L1A, L1B, L1C) can be switched over by the respective second switch (S2A, S2B, S2C) to a first recovery circuit (S1A, L1A, D2A; S1B, L1B, D2B; S1C, L1C, D2C), wherein, prior to each switching off of the respective second switch (S2A, S2B, S2C) the associated first switch (S1A, S1A, S1C) is brought into the conductive state for a predetermined short period of time and is then switched off.

2. High voltage rectifier in accordance with claim 1, characterised in that the respective first switch (S1A, S1B, S1C) and the second switch (S2A, S2B, S2C) comprise a semiconductor based switch, in particular a transistor or GTO switch which can be switched off by a control pulse or by several control pulses.

3. High voltage rectifier in accordance with claim 1, characterised in that a series circuit of a capacitor (C1S, C2S, C3S) and a resistor (R2S) is in each case provided parallel to the conductive paths of the switching members of the first and second switches (S1A S1B, S1C; S2A, S2B, S2C); and in that a diode (D2S) poled in the conductive direction of the switching member is connected in parallel to the resistor (R2S).

4. High voltage rectifier in accordance with claim 1, characterised in that at least two similar rectifier stages (A, B, C) are connected in series.

5. High voltage rectifier in accordance with claim 4, characterised in that the similar rectifier stages (A, B, C) are connected to a RCD network acting as a protection against overvoltages.

6. High voltage rectifier in accordance with claim 1, characterised in that a second recovery circuit for the choke (L1A; L1B; L1C) intended to smooth the current ripple is provided in each stage and is effective when the first and second switches (S1A, S2A; S1B, S2B; S1C, S2C) are switched off, with the recovery circuit including diodes (D1A, D2A; D1B, D2B; D1C, D2C) and the respective input side smoothing capacitor (C1A, C1B, C1C).

7. High voltage rectifier in accordance with claim 1, characterised in that the time point of switching in of the first switch (S1A, S1B, S1C) is time-delayed relative to the time point of switching in of the respective second switch (S2A, S2B, S2C).

8. High voltage rectifier in accordance with claim 1, characterised in that a control circuit for generating the control pulses (O1A, O2S; O1B, O2B; O1C, O2C) receives signals corresponding to the output current and to the output voltage and delivers control pulses on exceeding a predeterminable current value, with this predeterminable current value being lowered in dependence on a lowering of the voltage.

9. Electronic control circuit for a high voltage rectifier, characterised by a detection and regulation circuit which in dependence on the occurrence of an arc or a predeterminable maximum current, brings about a change-over from the voltage regulation used in normal operation to a regulation with current restriction, with the desired value of the current being at least substantially equal to the last transmitted actual value of the current prior to the occurrence of the arc, and with a switching back to the voltage regulation taking place with renewed adjustment of the output voltage to the maximum value as soon as the arc is quenched.

10. Electronic control circuit in accordance with claim 9, characterised in that on the transition to regulation with current restriction the multi-stage rectifier operation is switched over to single stage operation.

11. Electronic control circuit in accordance with claim 9, characterised in that an additional detector circuit is provided to detect an arc discharge which exceeds a predeterminable time and/or a predeterminable current value; and in that this detector circuit blocks all rectifier stages.

12. Electronic control circuit in accordance with claim 9, characterised in that a ramp generator is provided in order to return the desired values to the adjusted values and to bring the rectifier to normal operation following quenching of an arc discharge which brings about the zero setting of the output current and the output voltage.

* * * * *